United States Patent [19]

Kallenberger

[11] Patent Number: 5,522,536
[45] Date of Patent: Jun. 4, 1996

[54] APPARATUS AND METHOD FOR MOUNTING MACHINERY

[75] Inventor: Harvey J. Kallenberger, Wind Lake, Wis.

[73] Assignee: Harnischfeger Corporation, Brookfield, Wis.

[21] Appl. No.: 321,850

[22] Filed: Oct. 14, 1994

[51] Int. Cl.⁶ .................................................. B23K 31/02
[52] U.S. Cl. .................... 228/175; 29/525.14; 403/256; 403/14
[58] Field of Search .................................... 29/525.1, 256, 29/257; 403/256, 260, 13, 14; 37/468; 228/101, 57, 175, 185

[56] References Cited

U.S. PATENT DOCUMENTS

| | | | |
|---|---|---|---|
| 2,439,219 | 4/1948 | O'Conner | 403/256 |
| 3,146,522 | 1/1964 | Wright | 29/256 |
| 5,316,818 | 5/1994 | Hilliard | 403/256 |

Primary Examiner—Samuel M. Heinrich
Attorney, Agent, or Firm—Jansson & Shupe Ltd.

[57] ABSTRACT

A method and apparatus are used to mount a machine component, e.g., an electric motor, in alignment with another component such as a gear shaft of a gear transmission. The apparatus includes a bolt-attached U-shaped clamp device straddling a "foot-like" transmission mounting base. The legs are spaced greater than the horizontal thickness of the base to permit slight base movement during mounting. The clamp device has an interior height somewhat less than the vertical height of the base. The base is shimmed so that the motor shaft is vertically aligned with the gear shaft, horizontal and angular alignment is performed and then the clamp legs are shimmed. Leg shimming is to a height such that when the clamp bolts are tightened, the base shims are under substantial compressive force and the leg shims are under only somewhat less compressive force. One or more chock blocks are welded to the machine deck to help maintain base position.

6 Claims, 6 Drawing Sheets

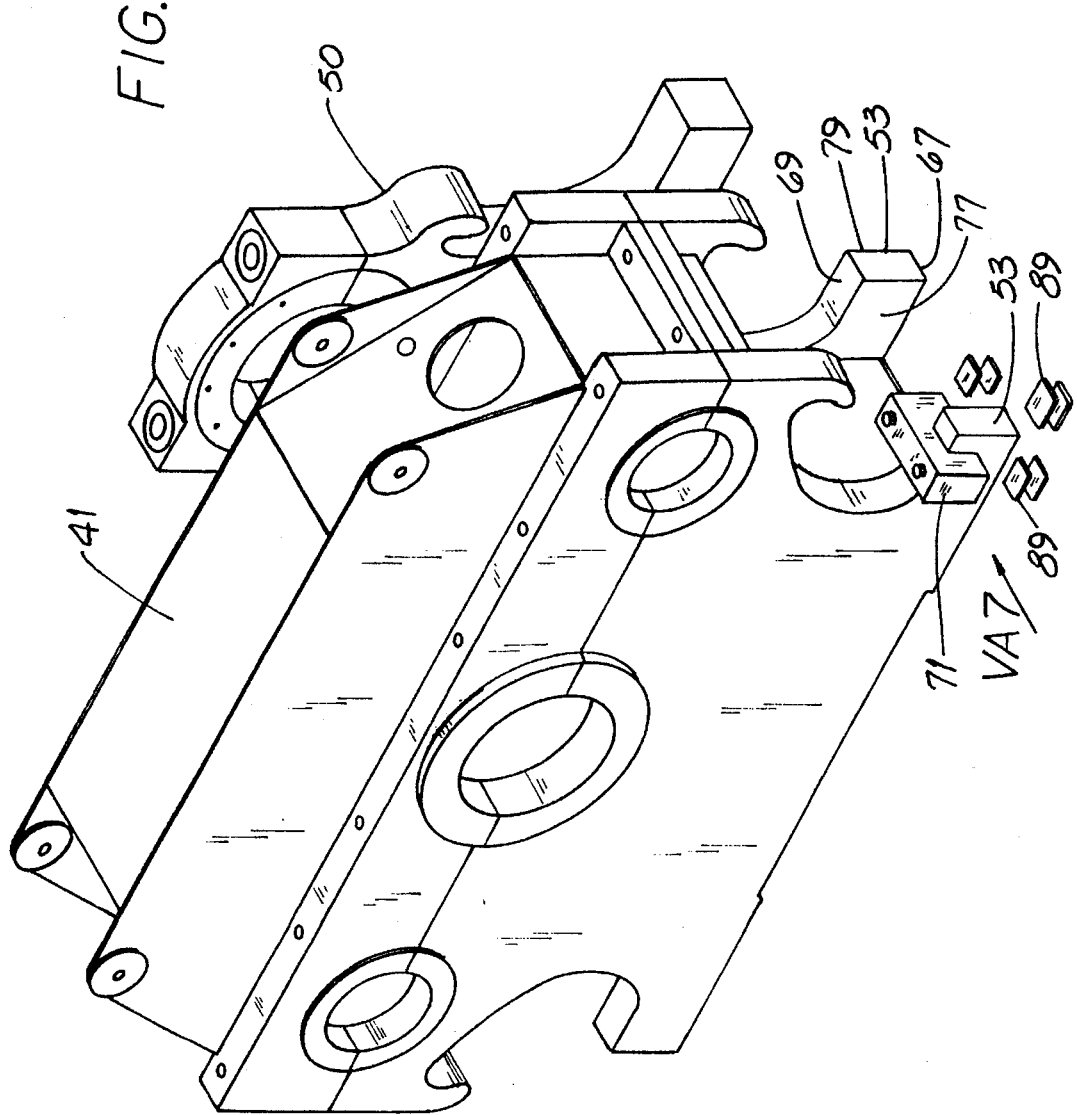

APPARATUS AND METHOD FOR MOUNTING MACHINERY

FIELD OF THE INVENTION

This invention relates generally to machinery and, more particularly, to mounting and aligning machinery components with one another.

BACKGROUND OF THE INVENTION

Many types of machines use machinery components, i.e., interconnected rotating components, to transfer power from, say, an internal combustion engine or an electric drive motor to some sort of "working" device. The proper functioning of such working device is critical to the primary purpose of the machine. As an example, an electric motor may be used to drive the input shaft of a gear transmission. The transmission output shaft may be coupled to a conveyor drive, a winch drum or the like.

Machinery components such as engines, motors and gear transmissions have rotating shafts supported on bearings. Each such component is intended to be coupled to another component and, ideally, components are coupled together so that the shaft axes of rotation are coincident and coextensive. To state it somewhat differently, ideal perfectly-aligned mounting occurs when the shaft axes are horizontally and vertically aligned with one another.

However, because of normal manufacturing tolerances and alignment practices, ideal perfectly-aligned component mounting rarely occurs. In recognition of that fact, manufacturers of such components and of component couplings select the component shaft bearings and configure the couplings to withstand a certain amount of misalignment. And such manufacturers often specify the maximum amount of misalignment that is acceptable and still achieve reasonable bearing and coupling life.

And alignment in a way that provides acceptable bearing and coupling life is not the only problem facing the machine assembler. Two components may have gears that are enmeshed when the machine is assembled. As an example, a gear transmission may have an output pinion gear that meshes with the large ring gear of a winch drum. Gear alignment is important at least to help assure that instead of being "localized," driving force is imposed along the entire width of gear teeth.

When the machine and, particularly, the components are relatively small, component handling and movement for acceptable shaft-to-shaft alignment is relatively easy at least in that such components can be "placed" and the mounting holes drilled with a rather high degree of precision and ease. On the other hand, there are some machines, e.g., a walking dragline, that are so large, they are assembled "on site." (Merely as an example, a large dragline may have a bucket capacity of 80 cubic yards, a weight of 8 million pounds and take upwards of a year to assemble in the field.

In the case of a product such as a large dragline, subassemblies are fabricated and machined at the factory. Until the advent of the invention, several coincident conditions had to occur to obtain shaft alignment of mounted components. The subassemblies, even though often dimensionally large and weighing several tons, had to have mounting surfaces machined with great precision.

And the components to be mounted on such surfaces had to have their mounting "feet" machined with great precision to be coplanar. Mounting holes in such feet (as well as in the subassembly mounting surface) had to be located precisely and the distance between the axis of the rotating shaft with respect to the plane of the mounting feet had to be accurately known. If attainable at all, the necessary all-around precision can be attained only with great difficulty and/or with the expense of further machining on-site. And, of course, the mounting problem becomes even more difficult on machines, the structural mounting surfaces of which have to be welded on-site.

An alternative to precisely-located mounting holes is to use holes substantially larger than required to accommodate the mating bolt or pin. While such oversize holes make alignment easier, the removal of extra metal reduces the fastener supporting bearing area and permits the bolt or pin to more easily "walk" or move slightly in the hole. Therefore, good alignment, even though once attained, can quickly be lost.

Another known approach to component mounting is by welding rather than using bolts or pins. Welding is not without its problems in that heat associated with welding often distorts metal parts—alignment which was satisfactory before welding can easily become unacceptable after welding. And irrespective of the way in which components are mounted, i.e., by bolts, pins or welds, it has been common practice to install welded-on "chock blocks" as a way to help prevent lateral component shifting over time.

An improved apparatus and method which addresses some of the aforementioned disadvantages would be an important advance in the art.

OBJECTS OF THE INVENTION

It is an object of the invention to provide apparatus and method overcoming some of the problems and shortcomings of the prior art.

Another object of the invention is to provide apparatus and method for mounting and aligning drive components.

Another object of the invention is to provide apparatus and method useful with unfinished or rough-finished machine mounting decks.

Yet another object of the invention is to provide apparatus and method permitting less precise location of mounting holes in machine mounting decks.

Another object of the invention is to provide apparatus and method obviating primary mounting of machine components by welding.

Still another object of the invention is to provide apparatus and method which retains full component-supporting bearing area on the mounting surface.

Another object of the invention is to provide apparatus and method useful to align machine components having intermeshing gears. How these and other objects are accomplished will become more apparent from the following descriptions and from the drawing.

SUMMARY OF THE INVENTION

The invention relates to a machine having a first component such as a winch drum mounted on a machine support deck. A second component, e.g., a "drum-driving" gear transmission with a mounting base, is to be mounted on the machine in alignment with the first component.

In the inventive apparatus, a support surface and a clamping face are formed on the mounting base, are generally planar and generally parallel to one another and are spaced from one another. A clamp device has a bearing face contacting the clamping face and an attachment surface spaced from the bearing face. The distance between the support surface and the clamping face is slightly greater than the distance between the bearing face and the attachment surface.

In one highly preferred embodiment, the attachment surface is generally planar and generally parallel to the bearing face and the deck is generally parallel to the bearing face. Preferably, at least one chock block is attached to the deck and contacts the mounting base for maintaining the position of the second component with respect to the first component. The chock block has a base-contacting edge and an outward edge which is longer than the base-contacting edge.

In another aspect of the invention, the component mounting base includes a pair of side faces spaced from one another. The clamp device includes a pair of legs spaced from one another and the distance between the legs is greater than the distance between the side faces. There is an air gap between the mounting base and at least one of the legs of the clamp device. When the base and clamp device are so configured, there is clearance for the mounting base to be moved laterally toward one leg or the other while effecting component alignment. In other words, the position of the base can be adjusted with respect to the clamp device.

In yet another aspect of the invention, a method for mounting a second component on a mounting deck in alignment with the first component includes providing a clamp device having a pair of legs straddling the base. The device is loosely attached to the deck as by bolts and the legs (specifically, the interior surfaces of such legs) are spaced by a distance greater than the distance between the side faces.

The second component is then aligned with the first component, thereby positioning the base between the legs and the clamp device is then shimmed. In a preferred method, the aligning step includes positioning the base between the legs so that an air gap is between the base and at least one leg. After such alignment and shimming, the clamp device is secured to the deck by tightening the bolts.

More specifically, the aligning step includes placing a group of base shims (two or more shims) between the base and the deck and the shimming step includes placing at least one leg shim between each of the legs and the deck. The securing step includes applying substantial compressive force to the base shims so that there is no gap between such base shims or between any shim and the mounting base and/or the mounting deck. To put it another way, the compressive force should be adequate to remove any "play" between the base, the shims and the deck.

Even though the second component is well secured by bolts, for example, it is also preferred to mount a chock block in contact with the base to maintain the second component in alignment with the first component. That is, the chock block, which is welded to the deck, is a redundant means to help prevent lateral shifting.

A highly preferred chock block includes a based-contacting edge, a pair of side edges and an outward edge. The mounting step includes welding the side edges to the deck and welding the outward edge to the deck. The side edges converge from the outward edge toward the base-contacting edge.

Further details regarding the invention are set forth in the following detailed description and in the drawing.

BRIEF DESCRIPTION OF THE DRAWINGS

FIG. 3 is an isometric view of the housing of the gear transmission and a related bearing support pedestal used in the winch of FIG. 2.

DETAILED DESCRIPTION OF PREFERRED EMBODIMENTS

Figure 1:
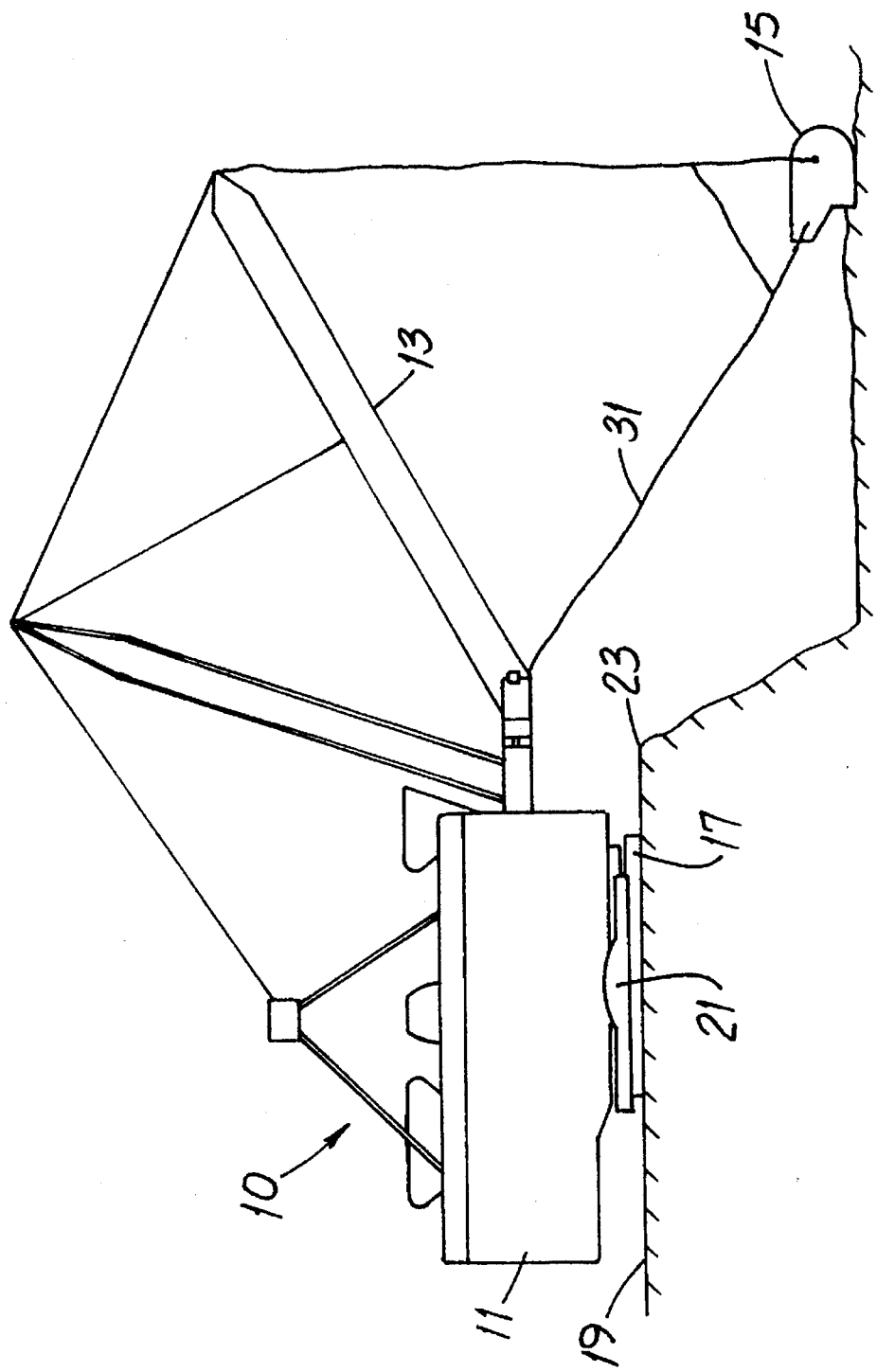
FIG. 1 is a representative side elevation view of a walking dragline.

Merely as an example of an application with which the invention can be used, such invention is described in conjunction with a walking dragline 10. Referring first to FIG. 1, the exemplary walking dragline 10 includes a main housing portion 11 having a boom 13 extending therefrom to support and manipulate a digging bucket 15. Within the housing portion are mounted winches for the bucket hoist function and the bucket drag function. The drive for the "walking" system and other drive components are also mounted therein.

When digging, the dragline 10 is supported by and pivots about a generally circular platform or "tub" 17 which rests on the earth's surface 19, The dragline 10 also includes a pair of pads 21 or "shoes" which, when moved in unison as described below, lift the tub 17 from the surface 19 and move the dragline 10 rearward away from the bucket 15. Using the bucket 15 as described below, removal of overburden progresses toward the dragline 10 until the edge 23 of the pit becomes relatively near to the dragline 10. Therefore, the dragline 10 must occasionally be moved rearward a few feet to expose additional overburden for digging.

When the dragline 10 is in operation, the bucket 15 is placed away from the dragline 10 and then drawn toward it for digging. After the bucket is filled, it is hoisted above the ground and the dragline housing portion 11 is pivotably swung toward one side for bucket emptying.

Figure 2:
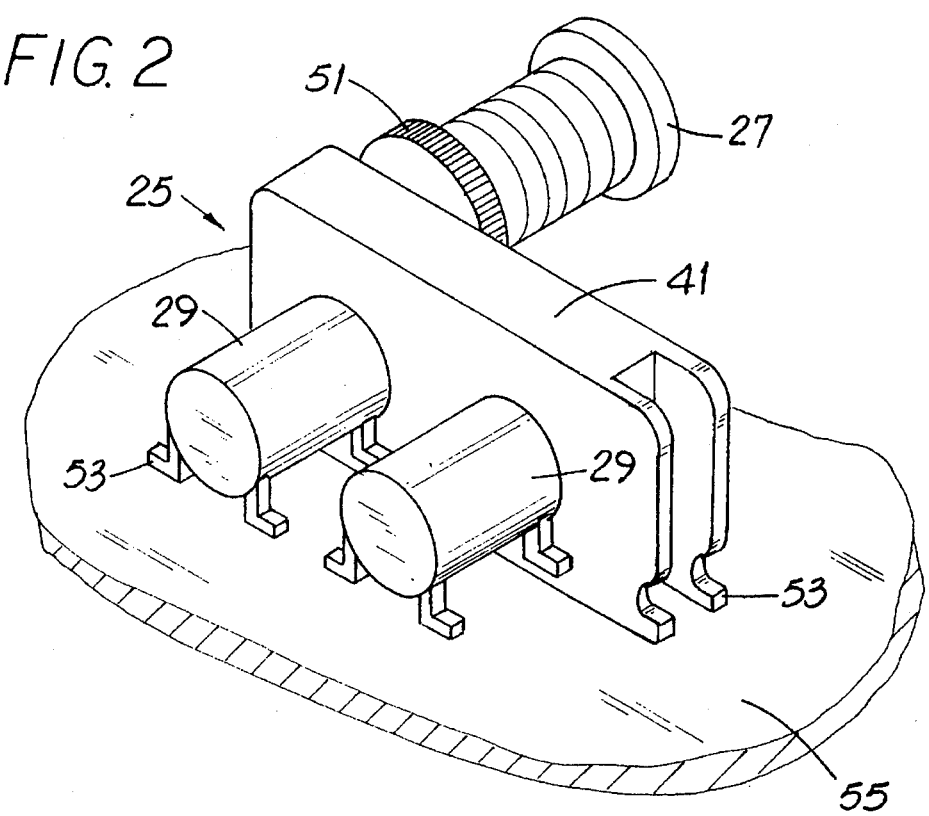
FIG. 2 a simplified isometric view of a winch used on the dragline of FIG. 1. Parts of the mounting deck are broken away.
Figure 4:
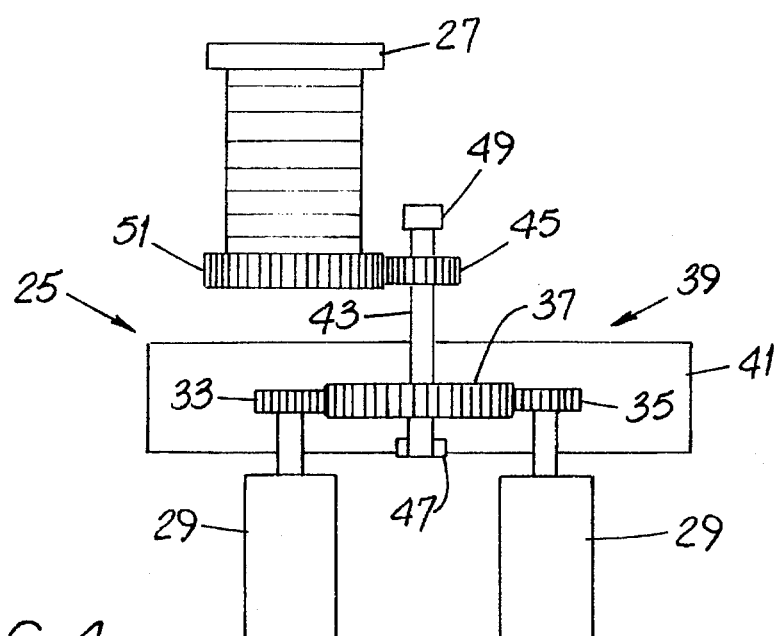
FIG. 4 is a simplified top plan view of the winch of FIG. 2. Parts are omitted for ease of explanation.

As an example of the way the invention may be used to mount machinery, such invention is described in conjunction with the winch used for dragging the bucket 15. Referring also to FIGS. 2, 3 and 4, motive power for dragging the bucket 15 is supplied by a winch 25 having a rotating drum 27 powered by electric motors 29. A rope-like steel cable 31 is wrapped around the drum 27 and when the drum 27 is rotated in the appropriate direction, the bucket 15 is pulled toward the dragline 10 much in the same way a fish is retrieved using a casting reel. The winch used for raising the bucket 15 is similar to the winch 25.

The winch 25 includes two electric drive motors 29, each of which drives a pinion gear 33 and 35, respectively, in engagement with the bull gear 37 of a gear transmission 39. Such transmission 39 has a housing 41 with a shaft 43 extending therethrough. The bull gear 37 and a smaller-diameter output pinion gear 45 are mounted on and rotate with such shaft 43. Such shaft 43 is supported by a housing bearing 47 and by an outboard bearing 49 in a support pedestal.

The output pinion gear 45 engages a bull gear 51 on the winch drum 27 and from the foregoing, it is apparent that when the motors 29 are energized, driving power is provided to rotate the drum 27. It will be noted that the motors 29 and the transmission 39 all include several outwardly-projecting mounting bases 53, reference to which is made below. (Merely to give an idea of scale, the bull gear 37 on a large dragline 10 may be six feet— about two meters—in diameter and over a foot—about 0.3 meter—thick.)

At least because of the physical size of the dragline 10, motors 29, gear transmission 39, winch drum 27 and the like, it is impractical if not impossible to ship those items assembled. And the machinery deck 55 and support mounts upon which the motors 29, transmission 39 and the like are mounted are very large and, often, assembled in the field by welding, bolting and the like. At least for these reasons, the winch drum bull gear 51, pinion gear 45, transmission 39 and motors 29 must be aligned with one another in the field.

Figure 5:
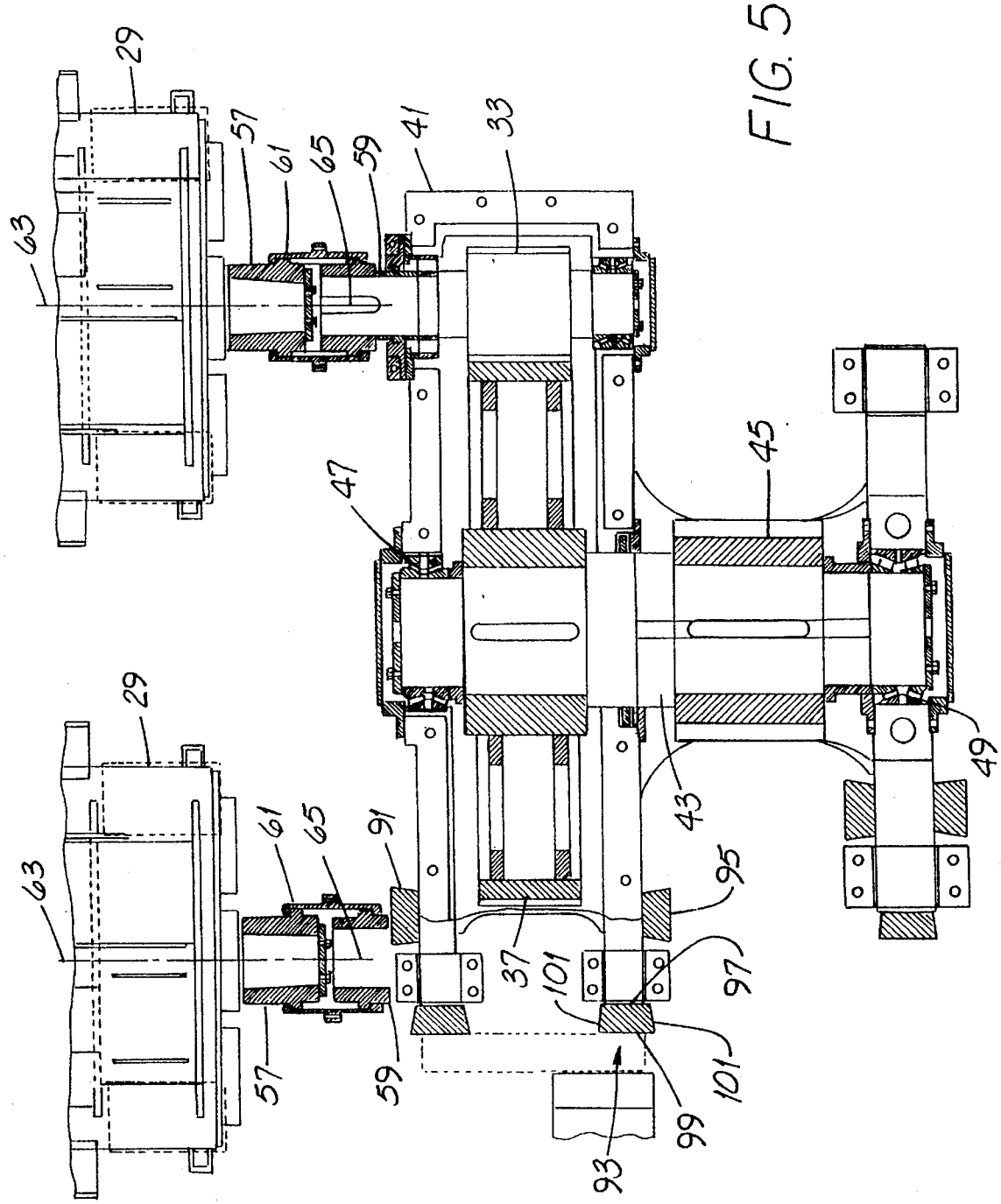
FIG. 5 is a more detailed top plan view of the winch gear transmission shown with electric motors. Parts are broken away, parts are shown in cross-section and other parts are omitted.

Reference to FIG. 5 will aid understanding as to why alignment is important and, when the components being mounted are large an unwieldly, why it is so difficult. (In FIG. 5, the pinion gear 35 shown in FIG. 4 is omitted.) And when considering the following explanation, the machinery deck 55 is assumed to have already been assembled. It will be recalled that component mounting holes may not be (and probably are not) in the precise locations shown in the machine fabrication and assembly drawings.

When a multi-component portion of a machine, e.g., the winch 25 of FIG. 2, is assembled in the field, good practice dictates that the winch drum 27 with its bull gear 51 be mounted first. Thereafter, the transmission 39 is mounted so that its output pinion gear 45 is properly aligned with the bull gear 51. The matter of gear alignment and its importance are discussed in the Background portion of this specification.

Following transmission mounting to the drum 27, the motors 29 are mounted to the transmission 39. Each motor 29 has an output shaft 57 which is attached to one of the two transmission input shafts 59 by a coupling 61. If the motors 29 and the respective shafts 59 were perfectly aligned, the rotation axes 63, 65 of the motors 29 and of the corresponding pinion gear shafts 63, 65 would be concentric and coextensive. That is, such axes, like axes 63 and 65, would constitute a single, straight line. Perfect alignment rarely occurs and the Background section of this specification explains how that fact is handled when designing components like motors 29, couplings 61 and gear transmissions 39.

Figure 6:
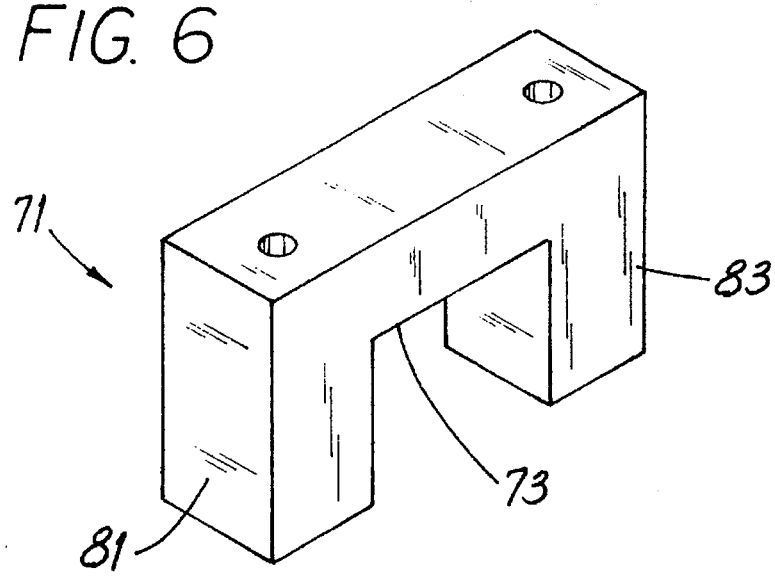
FIG. 6 is an isometric view of a clamp device of the invention.
Figure 7:
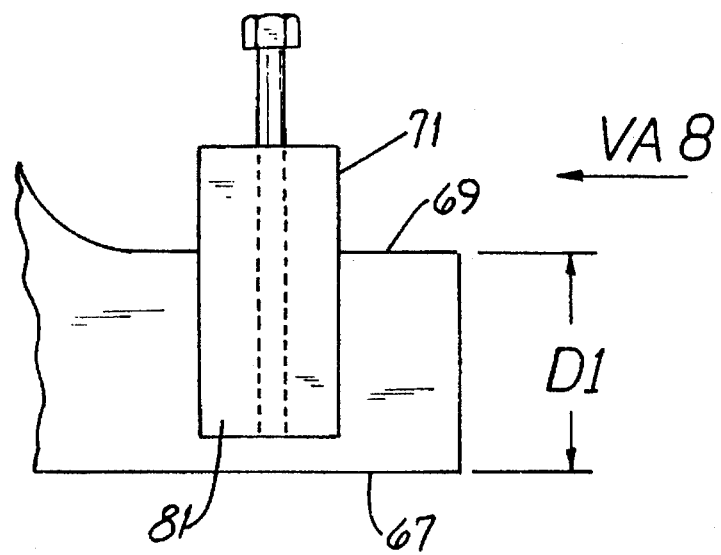
FIG. 7 is a side elevation view of a clamp device and a component mounting base as taken generally along the viewing axis VA 7 of FIG. 3. Parts are broken away and certain surfaces are shown in dashed outline.

Referring again to FIG. 3 and also to FIGS. 6, 7 and 8, aspects of the invention will now be described. A component mounting base 53 has a bottom support surface 67 and an upper clamping face 69. Such surface 67 and face 69 are generally planar, generally parallel to one another and are spaced from one another.

Figure 9:
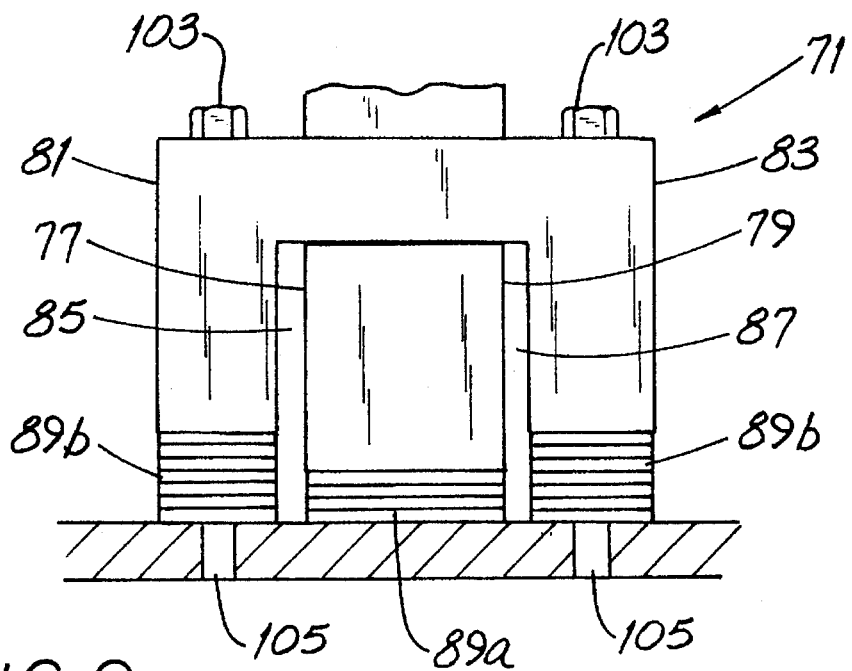
FIG. 9 is a view generally like that of FIG. 8 and also showing base and leg shims used with the invention.

A clamp device 71 shaped like an inverted "U" has a bearing face 73 which contacts the clamping face 69 when the clamp device 71 is mounted to clamp and secure the base 53 as shown in FIG. 9. The device 71 also has attachment surfaces 75a and 75b which are spaced from the bearing face 73, preferably by the same distance "D2." In most component mounting situations, it is easier to use the invention when the bearing face 73 and the attachment surfaces 75 are generally planar and generally parallel to one another and to the deck 55.

In a highly preferred embodiment, the distance "D1" between the mounting base support surface 67 and its clamping face 69 is slightly greater than the distance "D2" between the bearing face 73 and the attachment surfaces 75. (While it is possible, albeit awkward, to use a clamp device 71 in which the attachment surfaces 75a, 75b are at different distances from the bearing face 73, it is nevertheless preferred that each of both such distances "D2" be slightly less than the distance "D1 and be equal to one another.")

Figure 8:
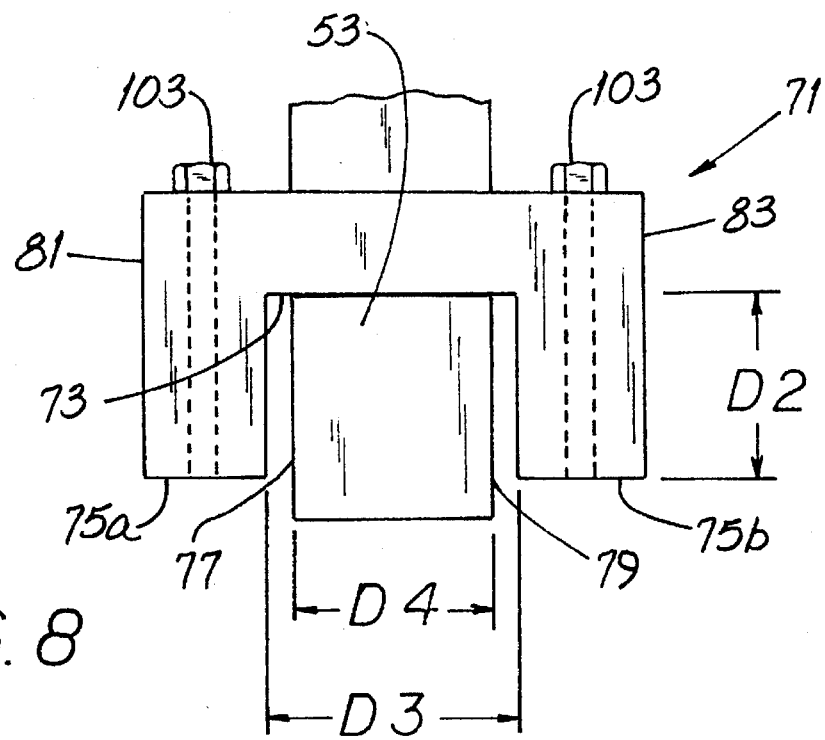
FIG. 8 is a front elevation view of the device and base of FIG. 7 taken generally along the viewing axis VA 8 of FIG. 7. Parts are broken away and certain surfaces are shown in dashed outline.

Referring now to FIGS. 8 and 9, the component mounting base 53 includes a pair of side faces 77, 79 spaced from one another. The clamp device 71 includes a pair of legs 81, 83 spaced from one another and the distance "D3" between the legs 81, 83 is greater than the distance "D4" between the side faces 77, 79. As a consequence of such dimensional relationship, there is at least one air gap 85 or 87 between the mounting base 53 and at least one of the legs 81, 83 of the clamp device 71. In the view of FIG. 9, there are two such air gaps 85, 87 but the following explanation makes it clear why only one such gap 85 or 87 may be present.

When the base 53 and clamp device 71 are so configured, there is clearance for the mounting base 53 to be moved laterally toward one leg 81 or the other leg 83 while effecting component alignment. In other words, the position of the base 53 can be adjusted with respect to the clamp device 71. In an extreme case, the base 53 may have to be moved to contact or to virtual contact with one of the legs 81 or 83. In that instance, only one air gap 85 or 87 would be present. When using the clamp device 71 to secure a mounting base 53, some shimming will be required and the way in which shims 89 are used is described below.

While clamping devices 71 do a good job of preventing mounting bases 53 from moving up and down, they may not entirely prevent lateral base movement within the device 71. It is often helpful to provide some redundant means to help prevent such lateral movement.

To that end (and referring again to FIG. 5), it is preferable to use at least one chock block 91, 93, 95 holding the base 53. Such block 91, 93, 95 is attached to the mounting surface, e.g., the deck 55, and contacts the mounting base 53 for maintaining the position of such base 53. The chock block 93 has a base-contacting edge 97 and an outward edge 99 which is longer than the base-contacting edge 97. Such chock block 93 is also "keystone-shaped" and has side edges 101 which converge when viewed from the outward edge 99 toward the base-contacting edge 97. A chock block 91, 93, 95 is mounted by first welding the side edges 101 to the deck 55 and then welding the outward edge 99 to the deck 55.

The depicted chock blocks 91, 93, 95 are preferred since when so shaped, so placed and so welded, the process of welding tends to draw the blocks 91, 93, 95 toward the base 53 rather than away from or lateral to such base 53. Accurate, more secure mounting results.

Turning now to the manner of using the clamp device 71 to mount a component, e.g., a motor 29, in alignment with another component, e.g., a gear transmission 39 and its gear shaft 59, the device 71 is placed so that its legs 81, 83 straddle the base 53 of the housing 41 as shown in FIGS. 3 and 8. The device 71 is loosely attached to the deck 55 as by bolts 103 extended into holes 105 in the deck 55. (It is to be appreciated that the holes 105 are located and drilled at the factory. In final assembly as is now being described, it will likely be found that such holes 105 are not located precisely where they are needed. Some of the reasons for such out-of-location holes 105 are mentioned above.)

Alignment of the motor shaft 57 with the gear shaft 59 is then undertaken and in so doing, accepted practice suggests that offset alignment (both vertically and horizontally) and angular alignment be done in that order. Referring particularly to FIGS. 3 and 9, vertical alignment of the motor shaft 57 with the gear shaft 59 includes placing one or a group of base shims 89a between the base 53 and the deck 55 until acceptable vertical alignment is attained.

To attain horizontal alignment, it is likely that the position of the base 53 between the legs 81, 83 and relative to such legs 81, 83 will be shifted slightly. To a certain extent, angular alignment is performed along with horizontal alignment but irrespective of that possibility, the clamp device 71 is shimmed after alignment is completed. Such shimming includes placing at least one leg shim 89b between each of the legs 81, 83 and the deck 55. (In FIGS. 3 and 9, the thickness of the shims 89 is exaggerated. In fact, shims 89 are very thin, perhaps on the order of the thickness of a sheet of bond paper.)

Leg shims 89b are used to the extent needed to completely fill the gap between the deck 55 and each leg attachment surface 75a, 75b of the clamp device 71. After such shims 89b are in place, the clamp device 71 is secured by applying substantial compressive force to the base shims 89a so that there is no gap between any shim 89a and the mounting base 53 and/or the mounting deck 55. To put it another way, the use of compressive force (by bolt tightening) and the use of leg shims 89b should be done in such a way as to remove any "play" between the base 53, the shims 89a and the deck 55 when such bolts 105 are tightened. Following such final bolt tightening, chock blocks 91, 93 95 are installed as described above.

While the principles of the invention have been disclosed in connection with preferred embodiments, it is to be understood clearly that such embodiments are by way of example and are not limiting.

What is claimed:

1. In a machine having a first component mounted thereon and having a rotatable part, a method for mounting a second component on a mounting deck in alignment with the first component and wherein the second component has another rotatable part and includes a mounting base having a pair of side faces spaced from one another by a distance, the method including the steps of:

providing a clamp device having a pair of legs straddling the base and spaced by a distance greater than the distance between the side faces;

aligning the second component with the first component, thereby positioning the base between the legs;

shimming the clamp device; and securing the clamp device to the deck.

2. The method of claim 1 wherein:

the aligning step includes placing a group of base shims between the base and the deck;

the shimming step includes placing at least one leg shim between each of the legs and the deck; and the securing step includes applying substantial compressive force to the base shims.

3. The method of claim 2 wherein the aligning step includes positioning the base between the legs so that an air gap is between the base and at least one leg.

4. The method of claim 2 further including the step of mounting a chock block in contact with the base to maintain the second component in alignment with the first component.

5. The method of claim 4 wherein the chock block includes a pair of side edges and an outward edge and the mounting step includes:

welding the side edges to the deck; and welding the outward edge to the deck.

6. The method of claim 4 wherein:

the chock block includes a base-contacting edge, a pair of side edges and an outward edge;

the side edges converge from the outward edge toward the base-contacting edge; and the mounting step includes welding the chock block to the deck.

* * * * *